(12) United States Patent
Wieczorek et al.

(10) Patent No.: US 7,963,582 B2
(45) Date of Patent: Jun. 21, 2011

(54) SLIDING VISOR

(75) Inventors: Joseph P. Wieczorek, Lake Orion, MI (US); Joseph R. Finn, Waterford, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 104 days.

(21) Appl. No.: 12/288,309

(22) Filed: Oct. 18, 2008

(65) Prior Publication Data

US 2010/0096878 A1   Apr. 22, 2010

(51) Int. Cl.
   *B60J 3/02* (2006.01)
(52) U.S. Cl. .................. 296/97.11; 296/97.12
(58) Field of Classification Search .......... 296/97.1, 296/97.4, 97.5, 97.6, 97.8, 97.9, 97.11, 97.13, 296/97.12; *B60J 3/02*
See application file for complete search history.

(56) References Cited

U.S. PATENT DOCUMENTS

| 4,521,046 A | 6/1985 | Foggini |
| 4,925,233 A | 5/1990 | Clark |
| 4,998,765 A | 3/1991 | Van Order et al. |
| 5,161,850 A | 11/1992 | Redder et al. |
| 5,409,285 A | 4/1995 | Snyder et al. |
| 5,445,427 A * | 8/1995 | Vandagriff ............... 296/97.6 |
| 5,580,118 A | 12/1996 | Crotty, III |
| 5,645,308 A | 7/1997 | Fink |
| 5,653,490 A | 8/1997 | Fink et al. |
| 5,823,603 A | 10/1998 | Crotty, III |
| 5,967,587 A * | 10/1999 | Collet et al. ............ 296/97.11 |
| 6,131,985 A | 10/2000 | Twietmeyer et al. |
| 6,174,019 B1 | 1/2001 | Collet et al. |
| 6,612,637 B1 | 9/2003 | Crotty |
| 6,692,059 B1 | 2/2004 | Mills |
| 6,698,814 B1 * | 3/2004 | Mills et al. ............ 296/97.11 |
| 6,863,332 B2 * | 3/2005 | Yasuhara et al. ......... 296/97.9 |
| 6,962,385 B2 * | 11/2005 | Wieczorek et al. ...... 296/97.11 |
| 2001/0024048 A1 | 9/2001 | Hobson et al. |
| 2001/0050493 A1 | 12/2001 | Welter |
| 2004/0145209 A1 | 7/2004 | Peterson |
| 2006/0175861 A1 * | 8/2006 | Ikeda et al. ............. 296/97.9 |

FOREIGN PATENT DOCUMENTS

JP    10151944 A    6/1998

* cited by examiner

*Primary Examiner* — Glenn Dayoan
*Assistant Examiner* — SunSurraye Westbrook
(74) *Attorney, Agent, or Firm* — Raggio & Dinnin, P.C.

(57) ABSTRACT

A sun visor for use in a vehicle is disclosed. The sun visor includes a first and second visor body shell. The shells define a retaining channel for a slider on a visor pivot rod and may be engaged and enclosed about the slider. It is also contemplated that the sun visor has a combination slider and detent slidably supported in channels molded into the first and second visor shells. A support arm may be provided and is readily offset from the combination slider and detent and is slidable relative thereto.

20 Claims, 3 Drawing Sheets

SLIDING VISOR

BACKGROUND OF THE INVENTION

1. Field of the Invention

The present invention generally relates to a movable sun visor for interior use in a vehicle, and more particularly to a sun visor wherein the visor body includes two visor body halves or shells adapted to close about and slidably retain a slider and detent assembly attached to a pivot rod.

2. Description of Related Art

Sun visors are well known and widely used in the prior art. Many different types of designs have been successfully employed in vehicles over the years. Many of these prior art visors have been developed in a variety of ways through which visor bodies and other interior components may be constructed and mounted within the vehicle. Advances in design can often add complexities to the manufacturing processes for interior components. There has been and continues to be a premium in the automotive industry on cost savings, and improvements in the efficiency and speed in the manufacturing processes for such components therein. One area of particular focus in the automobile technology field has been reducing the number and complexity of steps required to assemble interior components such as visors for use in vehicles.

Generally in the prior art, manufacturing simplicity continues to drive innovations in the automotive industry, loss of quality and performance in the manufacturing components for the sake of facilitating production is seldom, if ever, acceptable. There is a substantial body of art relating to the specific structure of the visor to provide a strong, light weight construction that matches or compliments the interior vehicle trim in a cost effective manner. Of particular interest has been the clam shell type construction, which involves the molding of two shell pieces or clam shell halves, which are joined to form the visor body. In one typical clam shell design, the visor halves are formed as a single piece attached along the longitudinal edge and then folded to form the visor body. The exterior surface can be molded to provide a suitable visor surface, or a desired covering can be added in a variety of different ways known in the prior art.

The clam shell design allows the visor body to be constructed relatively quickly and easily, however the various components that are attached to the visor clam shell halves must in some cases be incorporated with several assembly steps prior to securing the clam shell halves together. For example, some of the known designs require insertion of additional mounting or journaling pieces for retention of the visor pivot rod within the visor body. The construction of the visors having such a design is relatively time intense. Moreover, the various slides, journals retainers, etc., utilized in the construction may add significant expense and weight to the overall visor and increase the number of components necessary to build one therein.

Eliminating parts can reduce the expense of manufacturing and constructing a visor. The decrease in size and weight, however can be accompanied by a decrease in strength. Rotatable visors are a concern where flimsy construction of the visor core and slider components may be insufficient to withstand repeated torque actions on the visor shell itself, and in some cases cause dislodging or breaking of the pieces. It is thus desirable in the art to provide a visor that is lightweight, easy to manufacture and uses relatively few components, yet utilizes a design imparting significant durability to withstand heavy and repeated use and to provide a solid construction with tight tolerances throughout the entire system.

SUMMARY OF THE INVENTION

In one aspect the present invention provides a sun visor for a motor vehicle. The sun visor preferably includes a pivot rod and a slider attached to the pivot rod. A first shell having a first longitudinal channel integrally molded therein is also preferably provided and a second shell preferably having a second longitudinal channel portion integrally molded therein. The shells are engageable to form an elongated visor body, wherein engagement of the shells preferably substantially aligns the first and second longitudinal channel portions about a cover member arranged around a predetermined portion of the slider, which shall slidably retain the slider therebetween.

Another aspect of the present invention is that it provides a sun visor for a motor vehicle including a pivot rod and slider attached to the pivot rod. The first shell is provided preferably having a longitudinal channel portion molded therein for slidingly supporting a slider having a typar type wrap arranged around an outer surface thereof and further preferably having a support arm fixed to the shell and slidably received by the slider.

Other objects, features and advantages of the present invention will become apparent from the subsequent description and the appended claims, taken in conjunction with the accompanying drawings.

BRIEF DESCRIPTION OF THE PREFERRED EMBODIMENT(S)

Figure 1:
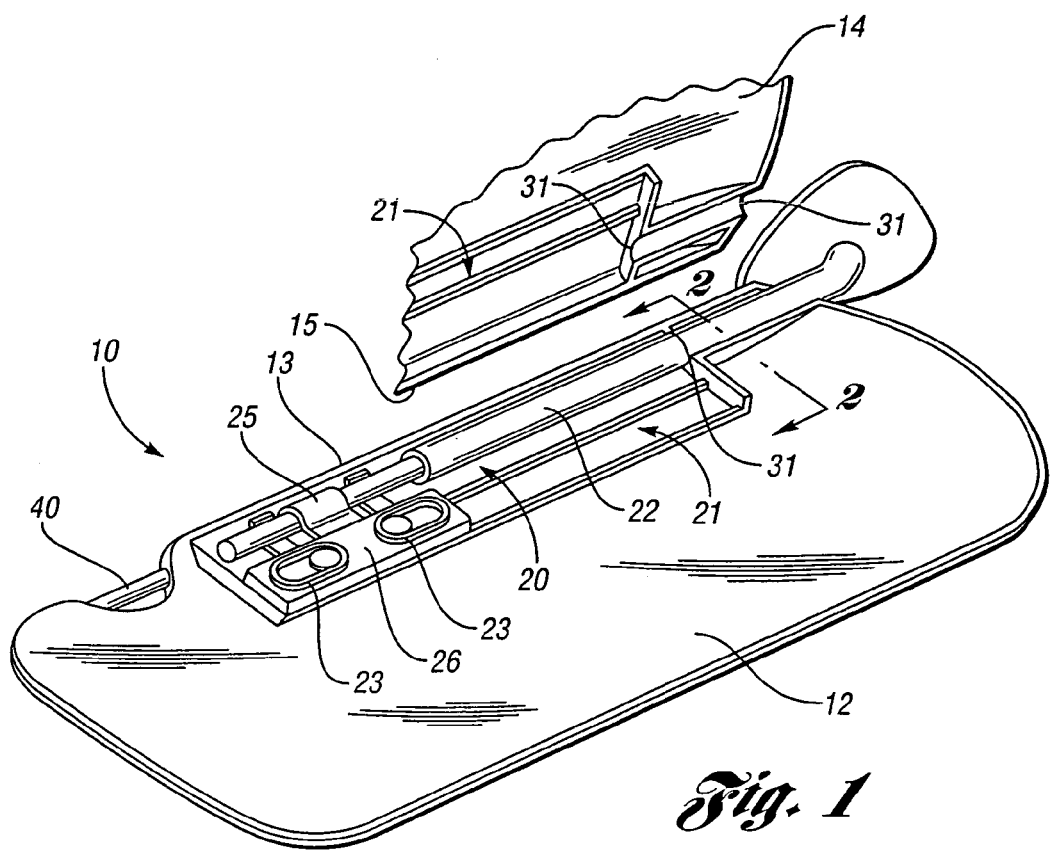
FIG. 1 is an unassembled visor according to an embodiment of the present invention.

Referring to the drawings, there is shown a visor 10 according to an embodiment of the present invention. FIG. 2 is a cross section taken at Line 2-2 through FIG. 1. Generally, the present invention broadly provides a clam shell type vehicle sun visor 10 having a pivot rod mounted to a combination slider and detent, wherein the pivot rod and slider detent is slidably captured during assembly with the single step of attaching visor shell portions together. The slider detent thus rides in the visor body itself rather than a separate carrier and is preferably retained between surfaces and/or features, such as channels molded integrally within the shell portions. Similarly, a pivot rod rides in the visor body, and a separate bracket, bezel or similar piece is not necessary to support the pivot rod. Related aspects of the present invention include methods for manufacturing a sun visor also described herein. Furthermore, it should be noted that the visor as shown in the present application can be used in any known type of vehicle, such as but not limited to, automotive vehicles, maritime vehicles, aerospace vehicles, military vehicles and any other known vehicle that has a need for the sun to be blocked from filtering into the interior compartment of the vehicle.

Figure 2:
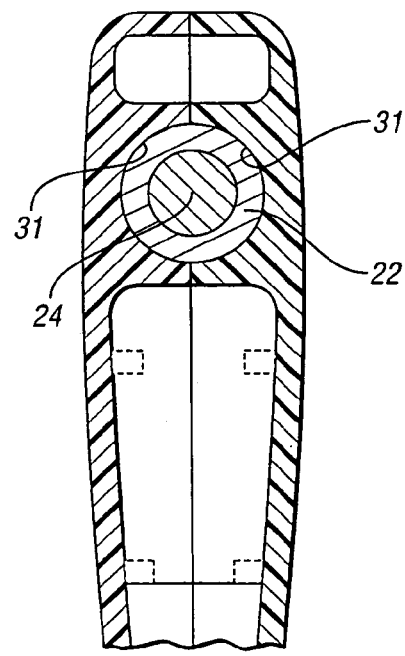
FIG. 2 is a cross section of a visor taken through Line 2-2 of FIG. 1.

In one embodiment shown in FIGS. 1 and 2, the visor 10 includes a first and second shell halves or shells 12 and 14 engageable to form the elongate visor body. Various molded features may be included on each shell to facilitate engagement of the shells. For example, complimentary structures may be formed on the respective visor shells that allow a snap fit therebetween. In one contemplated embodiment, the shells 12, 14 will be formed having integral or connected longitudinal peripheral edges 13 and 15, respectively. Other embodiments are contemplated in which the shells 12, 14 are formed as separate, unconnected members. Although connected shells are preferred, the visor 10, as shown in FIG. 1, is illustrated as having separate, unconnected shells for clarity and ease of description. The visor 10 further includes a pivot rod assembly 20 that comprises a pivot rod 22, and a pivot rod slider 26. The visor 10 is preferably formed such that the shells 12, 24 can be closed about the pivot rod 22 and as such capture the pivot rod 22 therebetween in a single assembly step. Also, the slider 26 is slidably captured by the closure or engagement of the shells 12, 14 slidably securing the slider 26 between the shells 12, 14 without the need for installation of an internal slider member, retainer or similar mechanism for mounting the pivot rod assembly 20. All of the component parts of the visor 10 are manufactured from known materials and by known processes, such as but not limited to, any type of plastic, metal, ceramic, composite, natural materials, or any other known material and by any type of molding technique, forming technique, chemical or mechanical process to design the components as described above.

In one known embodiment, the shells 12, 14 are formed by injection molding the plastic material in a conventional manner. For example, the shells 12, 14 may be formed from a molded polyethylene or by some other suitable method and/or material. The first and second shells 12, 14 generally include arcuate retainer surfaces 31. There are various contemplated designs for the arcuate surfaces 31 although other embodiments and variations of the design are also contemplated at this time. In one embodiment, one or more arcuate retaining surfaces 31 on each shell are arranged in a predetermined manner such that they comprise a relatively narrow arcuate ledge extending outwardly from and substantially normal to the visor shell 12, 14. A second embodiment contemplated may include arcuate retaining surfaces 31 that are elongate, trough shaped surfaces extending parallel to an edge of the visor shell 12, 14 and defining a portion of a cylinder wall. It should further be appreciated that the present invention may encompass designs with the arcuate retaining surfaces 31 that vary in dimension between longer, trough-shaped features and the narrow arcuate ledges as shown in FIG. 1. It should further be noted that in FIG. 2 the cross section of the arcuate retaining surfaces 31 defines an at least partially circular cross section, preferably complimentary to the outer surface shape of the pivot rod 22. Therefore, any known arcuate retaining surfaces 31 may be arranged and designed in any known shape on the inside surfaces of the shells 12, 14 to provide for a method of securing the visor shells 12, 14 together and supporting a visor pivot rod 22 and other visor components therein.

As shown in FIG. 1 the arcuate ledges 31 are positioned substantially in opposition about the pivot rod 22 when the visor shells 12, 14 are engaged. As one example, a pair of arcuate ledges might be molded into each half shell, and the ledges brought substantially into aligned opposition about the pivot rod 22 as the shells 12, 14 are brought together and engaged. Hence, when the pivot rod 22 is placed against one or more ledges on one of the shells 12, 14, the two visor shells can be brought together to capture the pivot rod 22 between the ledges 31 and the opposing shell halves 12, 14. It should be noted that although a plurality of ledges 31 is preferred, a single ledge on each half shell 12, 14 might be used without departing from the scope of the present invention. In another contemplated embodiment the shell halves 12, 14 and/or the pivot rod 22 are formed from a polymeric material having sufficient lubricitity that the pivot rod 22 is rotatably journaled by ledges 31 in the shell halves. The shell halves 12, 14 might also be designed such that they only loosely capture the pivot rod 22 and thus allow rotation thereof relative to the pivot rod 22. The ledges 31 are preferably molded integrally with the shell halves 12, 14, but might also be formed as separate arcuate members attachable to the shells prior to assembly therein. Still further, although the arcuate surfaces are preferably formed in shells 12, 14 in the molding step, they might be formed by post molding modification in the molded shell halves if desired through machining techniques or the like.

In FIG. 1 numeral 21 identifies a channel portion within which slider 26 or a portion of the slider 26 preferably rides. The slider 26 is substantially planar and includes a plurality of locating projections 23 that are fitted within channel portion 21 during visor assembly. In one embodiment, the slider 26 is plastic, and the locating projections 23 are integrally molded therewith, although it should be appreciated that alternative designs are possible wherein fasteners or some other suitable type of projections are attached to the slider 26 and fit within the channel portion 21. A clip detent assembly 25 comprising a plurality of opposed clip members is preferably included as a part of the slider 26 and facilitates lockable rotation of the pivot rod 22 relative thereto via a flat on the pivot rod 22. It should be appreciated that the channels 21 may be formed in one or both of the shells 12, 14. Likewise, the locating projections 23 may be included on either or both sides of the slider 26 whereby they are engaged with channels 21. In one embodiment, each channel 21 comprises a pair of thin parallel walls that project upwardly from a main substantially planar portion of the visor shells 12, 14. It should further be appreciated that although it is preferred, it is not critical to provide channels 21 that are complementary to or otherwise adapted for engaging locating projections 23 on the slider 26. The shells 12, 14 may be molded such that they have a channel or channels that capture the entire slider 26, rather than just capturing locating projections 23 thereon. In such an embodiment the visor shells 12, 14 would be engaged and attached, thereby aligning the channel about the slider 26. Similar to the description with respect to the arcuate surfaces 31, engagement of shells 12, 14 preferably retains the slider 26 therebetween in a single assembly step. A conventional clip rod 40 is preferably provided for snap fitting visor 10 with a holder in the vehicle headliner. It should also be noted that in another contemplated embodiment the slider detent assembly 26 may be wrapped or surrounded by a cover member 50 made of a predetermined material. This cover member 50 may help reduce the sliding efforts of the slider 26 between the two visor shell halves 12, 14. Furthermore, the cover member 50 may increase the fit and finish of the visor 10 and reduce any tolerances or slop between the slider 26 and the channels 21 formed within the visor halves 12, 14. This will create a clean, crisp, solid and durable sliding visor 10 capable of pivoting about the pivot rod 22 into predetermined positions within the vehicle interior. Any known methodology may be used to secure the flexible cover member 50 to the outside or inside surfaces of the slider 26 according to the present invention.

In relation to the constructed visors described above, the present invention may include a method for manufacturing a visor 10. In one embodiment, the method preferably includes a step of molding first and second visor shells 12, 14, wherein each of the shells 12, 14 includes an integrally molded channel 21 in an inner side thereof. The method further may include a step of aligning a slider 26 on a pivot rod 22 with the channels 21. The method may also include partially covering a predetermined outer portion of the slider 26 with a cover material 50. The method further may include the step of aligning and attaching the first and second shell portions 12, 14, such that the channels 21 are substantially opposed, the channels 21 thereby slidably retaining the slider 26 that is disposed between the shells 12, 14 with the cover member 50 arranged between the inner surface of the shell 12, 14 and the outer surface of the slider 26.

As the shells 12, 14 are engaged, the arcuate retaining surfaces 31 are positioned such that they are substantially opposed about the pivot rod 22. The term "substantially opposed" as used herein should be understood to encompass designs wherein arcuate ledges of one shell half engage the pivot rod 22 substantially opposite the arcuate ledges of the other shell half, as well as designs wherein the arcuate ledges on a first half are at staggered positions relative to the arcuate ledges of the other half. For example, the ledges might be positioned in alternating locations rather than opposing positions. The shell halves may also have a ring formed where the visor pivot rod 22 is slipped through the ring prior to connecting the visor shell halves along channels therein.

The present invention may allow a visor 10 to be assembled in fewer steps than many earlier visor designs. By eliminating a separate carrier for the pivot rod 22 and slider 26 and instead carrying the pivot rod 22 and slider 26 between the visor shells 12, 14, the present design reduces the number of components that must be incorporated into the final visor assembly. Similarly, the slider 26 rides within the visor body itself and it also does not require a separate carrier. When the visor shells 12, 14 are fully assembled into a visor body, the visor body may be rotated or slid as a unit relative to the pivot rod 22. A vehicle occupant may manually manipulate the visor 10 pulling it away from the visor mount and the headliner to draw the visor 10 along the slider 26, which remains slidably held between the shells 12, 14. Similarly, rotational force can be exerted on the exterior of the visor 10 by an occupant to adjust the angle of the visor in relation to the vehicle therein and a window to which the occupant is seated. Further still, combining a detent with the laterally offset slider relative to the pivot rod itself imparts a greater mechanical advantage with respect to rotation of the visor relative to the pivot rod 22 than in designs where the slider 26 is not laterally offset from the detent to a similar degree. Accordingly, a relatively more robust detent may be used without rendering rotation of the visor body relative to the pivot rod unduly difficult. The preferred offset design further allows a relatively thin visor body to be formed without the necessity of a bulky detent and slider mechanism positioned about the pivot rod 22.

Figure 3:
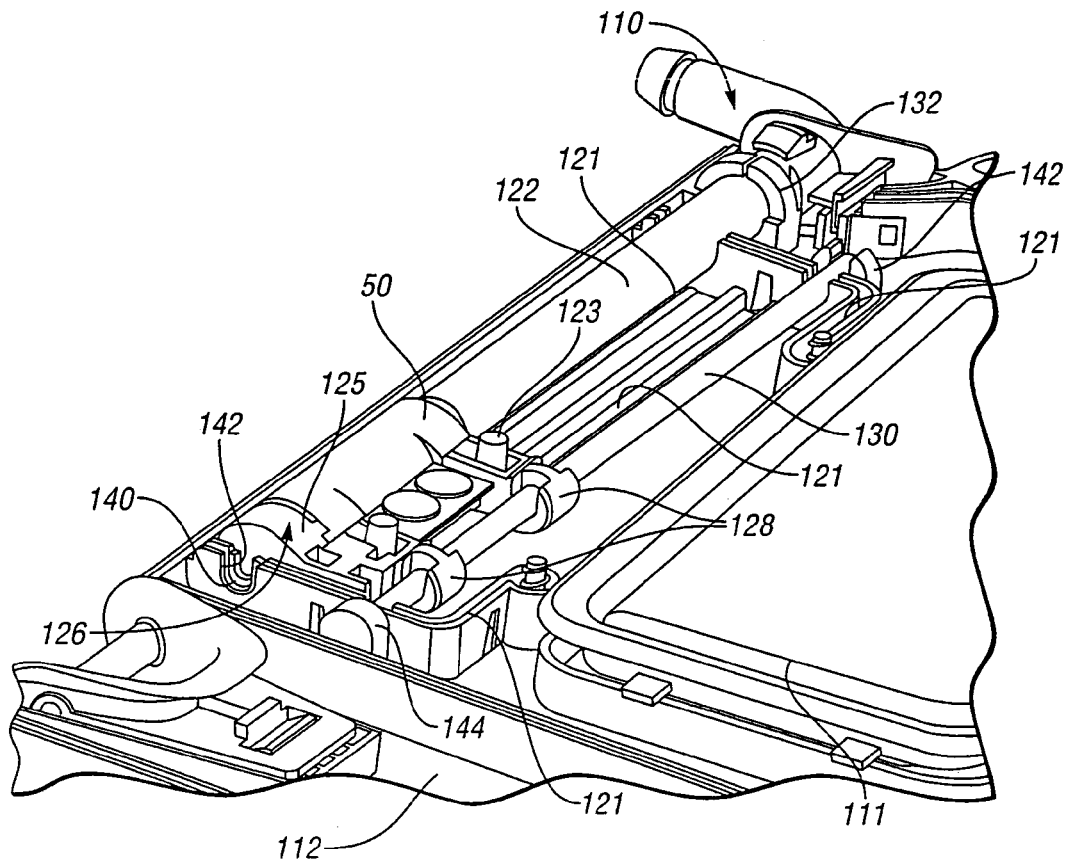
FIG. 3 is an unassembled visor according to an alternate embodiment of the present invention.
Figure 4:
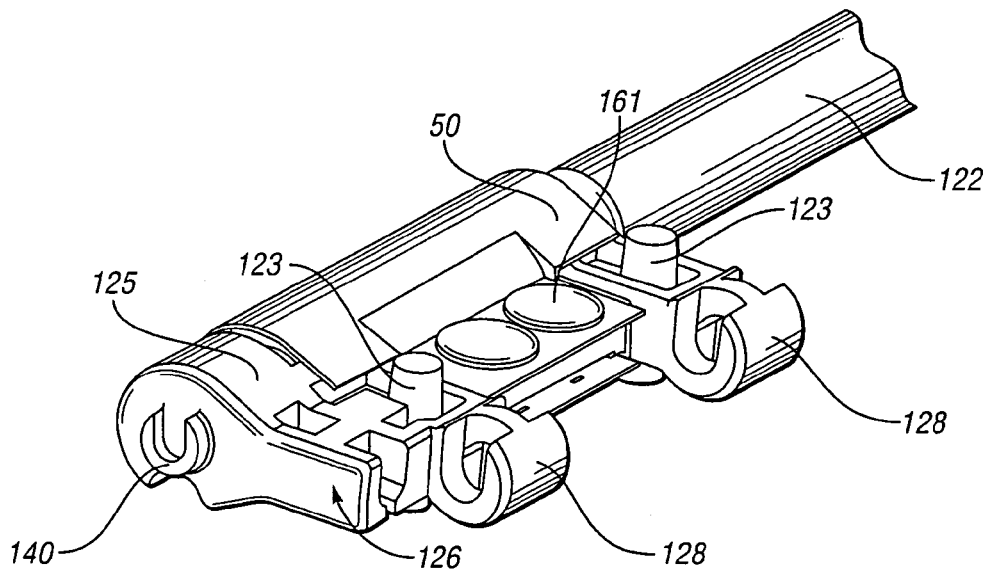
FIG. 4 is an elevational view of a slider member according to the alternate embodiment of the present invention shown in FIG. 3.
Figure 5A:
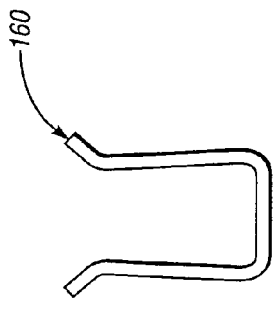
FIGS. 5 and 5a are side and end views of a detent retainer.
Figure 6A:
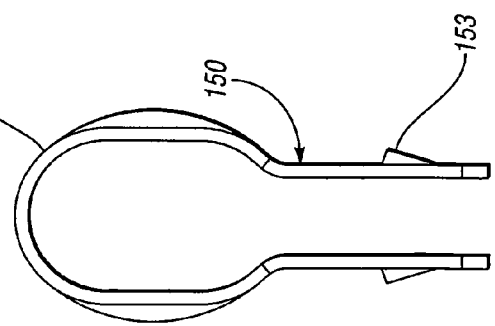
FIGS. 6 and 6a are side and end views of a detent clip.
Figure 5:
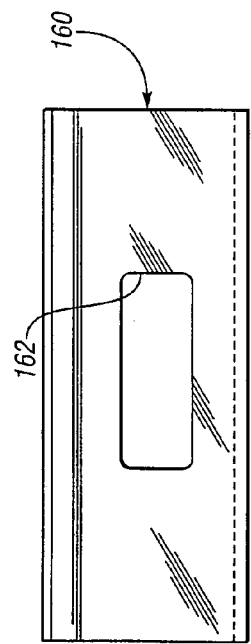
Figure 6:
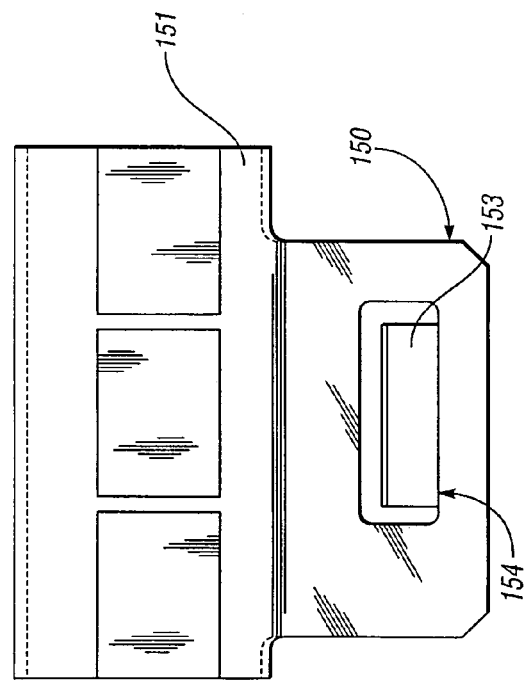

FIGS. 3 and 4 shows an alternate embodiment of a clam shell visor 110 according to another embodiment of the present invention. The shell 112 may include a visor body preferably molded of plastic, however it may be any other type of moldable or formable material that may have a bendable ear arranged near an outer portion thereof. The visor 110 may also include within the shell 112 a series of channels 121 molded in predetermined positions that may include wire reinforcements or other reinforcements therein and also channels 121 for passing electric current through to a visor vanity mirror 111 that is arranged within a predetermined shaped orifice through one half of a visor shell 112. The shell 112 may also include at least one retaining hoop 132 adapted to receive a visor pivot rod 122 inserted therethrough. It should also be noted that a plurality of retainer hoops 132 may also be arranged along a longitudinal length of the visor 110 near one edge thereof. The hoops 132 may be positioned about the pivot rod 122 relatively loosely such that the pivot rod 122 can be rotated and slid relative to the hoop 132. In one embodiment, the visor shell 112 is incorporated into the visor having two similar shell halves, the visor shell 112 being a first shell and having hoops 132 while the second shell may be formed without such retainer hoops, however it is contemplated to have no hoops or half of hoop on each such that when the visor pivot rod 122 is placed between the two half shells a hoop is formed thereover. The visor shell 112 further may preferably include a support arm 130 mounted in at least one mounting bracket 142 that is formed in at least one of the visor half shells 112. The support arm 130 preferably will snap into the bracket 142 and then it is preferably sent into engagement with a second bracket 144. However, any other method of securing in the support arm 130 may also be used with the present invention. Alternate embodiments are contemplated wherein the support arm 130 is integrally molded with the shell 112 rather than formed as a separate member and attached thereto. The support arm 130 may be made of any known material, such as a plastic, composite, metal, ceramic, or any known natural material.

The shell 112 in the second embodiment as shown in FIGS. 3 and 4 may also include a channel 121 integrally molded therein. A slider 126 preferably including a plurality of locating projections 123, adapted to slidably support the slider 126 relative to the channel 121. In one contemplated embodiment the slider 126 may have locating projections 123 extending from both sides thereof. In the contemplated embodiment the slider projections 123 generally have a cylindrical shape but any other known shape may also be used for the locating projections 123. In the embodiment shown the slider 126 comprises two locating projections 123 on both sides thereof. However, alternate embodiments are contemplated wherein a greater or lesser number of locating projections 123 may be used in any known shape. Generally, the use of a plurality spaced locating projections 123 in the disclosed embodiment will assist in providing relative support between the visor 110 and pivot rod 122 via an interaction between the channel 121 and the supporting protrusion 123 sliding therein. It should be noted that multiple channels 121 may also be arranged in the visor half shell 112 to allow for interaction with different portions of the slider 126 and any locating projections 123 extending therefrom. The slider 126 is preferably attached to the pivot rod 122 such as that shown in FIG. 3 via a plurality of journals 125, which rotatably retain the pivot rod 122 therein. In one embodiment the pivot rod 122 is coated with a relatively low friction plastic, such as a polytetrafluoroethylene to facilitate rotating relative to the journals 125 as well as sliding and rotating relative to the hoops 132 arranged in the visor shell 112. The slider 126 is further preferably equipped with a plurality of supporting extensions 128 which slidably engage the support arm 130. The supporting extensions 28 are preferably an arcuate member that is positioned over the support arm 130. An end protrusion 190 is also preferably provided at one end of the slider 126 opposite of the pivot rod 122. This end protrusion 140 is preferably received in a substantially mating stop 142 positioned at the opposite end of the channel 121 of the visor shell 112. Thus the slider 126 slides back and forth relative to the shell 112, stop 142 limits the travel of the slider 126 and then the mating engagement of stop 142 with the end protrusion 140 provides support and rigidity to the visor 110 when the slider 126 is positioned at the opposite end of its travel limits relative to the visor 110 within which it rides. Further, engagement of stop 142 with the end protrusion 140 provides for relatively solid leverage, allowing the visor 110 to be rotated relative to the slider 126, overcoming the detent force relatively easily.

The slider 126 may also include a flexible cover member 50 arranged over a predetermined portion of the slider 126. In one contemplated embodiment the cover member 50 may be made of a polypropylene material. This polypropylene material is flexible and will allow for a tight fit of the cover member 50 over the outer surface of the slider 126 and the detent 150. The polypropylene material is generally a spun bonded material that is available in any known shape and in any known thickness and may even be of the brand known as Typar. It should be noted that any other flexible cover type material that is capable of allowing for flexible engagement between the slider 126 and the inner surfaces of the shell halves 112 of the visor body may also be used. The flexible cover member 50 of the present invention generally may have a predetermined shaped body member with a predetermined shaped extension extending from each end thereof. The width of the extensions will be less than that of the overall width of the main body portion of the flexible cover member 50. The cover member 50 may be secured to the outside surface of the slider 120 or detent 150 via any known fastening technique. In one contemplated embodiment as shown in FIGS. 3 and 4, the technique will include a mechanical fastener 161 such as the rivet 161 shown. A second rivet 161 is also used in the embodiment shown in FIGS. 3 and 4. It should be noted that any number of fasteners 160 may be used. However, any other known mechanical fastener, such as but not limited to a nail, a screw, or any other known mechanical fastening technique may be used to secure the flexible cover member 50 to the outer surface of the slider 120. It should further be noted that any known chemical fastening technique may also be used, such as but not limited to glue, epoxy, heat staking, or any other type of chemical type fastening techniques may be used to secure the flexible cover member 50 to the outer surface of the slider 126 prior to insertion within the channels 121 of the visor 10. The use of the cover member 50 made of a Typar material greatly reduces any slop or wobble, thus increasing the tolerances between the visor body 112, the slider 120, and pivot rod 122. This will allow for a cleaner and smooth sliding of the pivot rod 122 with relation to the visor body 112. It will also remove any wobble, looseness, from the visor body with relation to the pivot rod 122 thus increasing the aesthetic appeal to the user of the visor 110 within the automotive vehicle. It will create a sturdy and durable feel to the user over that of prior art slidable visors.

The embodiment shown in FIGS. 3 and 4 also use component pieces of a detent assembly 150 within the present invention. A clip 151 is preferably a bent metallic piece having a rounded upper portion and a substantially straight lower portion comprising two substantial identical legs. A tab 153 is formed integrally with each of the legs and joined thereto along an attachment edge. However, in another contemplated embodiment an orifice will be used without the tabs therein which will allow for the passing of the fastener 161 therethrough to connect the flexible outer cover 50 via the detent 150 over the slider 126. The tab 153 is preferably formed integrally with each of the legs and joined thereto along an attachment edge. In another contemplated embodiment the tab 153 is bent slightly outward from the plane of the leg to which it is attached. The detent 150 may also include a detent retainer 160 adapted to engage with the clip 151. The detent retainer 160 preferably includes a window 162 allowing engagement with the tab 153 when the retainer 160 and clip 151 are engaged. In one contemplated embodiment a plastic detent having a shape conforming to an inside clip is placed therein and the retainer slid into engagement therewith. Thus, engagement of the clip 151 and retainer 160 preferably secures the entire detent assembly 150, slider 126 and pivot rod 122 together. The support arm 130 may be slid into engagement with the slider 126 prior to completion of the detent assembly or subsequently thereto. It is contemplated to use the mechanical fasteners 161 or chemical fasteners used to secure the cover member 50 over the outer surface of the slider 126 to secure the detent 150 to the slider 126 as another embodiment of completing the slider detent assembly. It should be noted that the flexible cover member 50 covers a predetermined outer portion of the slider/detent assembly 126. In one contemplated embodiment the entire outer surface would be covered by the flexible cover member 50 and another contemplated embodiment only a smaller portion than that shown in FIG. 3 would be covered by the flexible cover member 50. Therefore, it should be noted that it is contemplated to use any type of flexible cover member 50 in any size to cover any predetermined portion of the outer surface of the slider 126 or detent 150 depending on the design requirements and type of channels and sliders being used in the visor assembly according to the present invention.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A sun visor for a vehicle, said visor comprising:
   a pivot rod;
   a combination slider and detent attached to said pivot rod;
   a first shell and second shell being engageable to form a visor body; and
   said combination slider and detent being slidably retained between said first shell and said second shell, said slider and detent having a flexible cover member arranged over a predetermined portion thereof, said flexible cover member having an inside and outside surface, said inside surface engages said combination slider and detent and said outside surface engages said first and second shell.

2. The visor of claim 1 wherein said cover member is made of a polypropylene material.

3. The visor of claim 2 wherein said polypropylene is spun bonded.

4. The visor of claim 1 wherein said cover member is secured to an outside surface of said slider with a fastener.

5. The visor of claim 4 wherein said fastener is a rivet.

6. The visor of claim 4 further comprising a second fastener.

7. The visor of claim 1 wherein said cover partially surrounds said slider and detent.

8. The visor of claim 1 further comprising a support arm slidably engaging said slider and detent.

9. The visor of claim 1 wherein said first shell having a channel arranged therein and said second shell having a channel arranged therein.

10. The visor of claim 9 further comprising a plurality of locating projections extending from a surface of said slider, said projections are slidably arranged in one of said channels.

11. A visor for use in a vehicle comprising:
    a first shell having a channel;
    a second shell engageable with said first shell to form a visor body;

a slider arranged in said visor body, said slider having at least one locating projection slidably engaging said channel;
a detent assembly attached to said slider;
a support arm slidably engaging said slider; and
a flexible cover member arranged over a predetermined portion of said slider and said detent, said flexible cover member having an inside and outside surface, said inside surface engages said combination slider and detent and said outside surface engages said first and second shell.

12. The visor of claim 11 wherein said cover member is made of a polypropylene material.

13. The visor of claim 12 wherein said polypropylene is spun bonded.

14. The visor of claim 11 wherein said cover member contacts an outside surface of said detent and said slider.

15. The visor of claim 14 further comprising a fastener, said fastener secures said cover member to said detent and said slider.

16. The visor of claim 11 wherein said cover member partially surrounds said slider and said detent.

17. The visor of claim 11 wherein said support arm is offset from said channel.

18. The visor of claim 11 wherein said slider having a plurality of locating projections.

19. The visor of claim 18 wherein at least one of said plurality of locating projections extends from each side of said slider.

20. A method of manufacturing a sun visor comprising the steps of:
molding a first and second visor shell, each of said shells having a molded channel on an interior side thereof;
aligning a slider attached to a pivot rod with said at least one shell having said channel, said slider is partially surrounded by a flexible polypropylene cover member; and
attaching said shells wherein said slider is secured between said visor shells in a single step assembly and is thereby slidably retained by said visor shells.

* * * * *

UNITED STATES PATENT AND TRADEMARK OFFICE
CERTIFICATE OF CORRECTION

PATENT NO.      : 7,963,582 B2                              Page 1 of 1
APPLICATION NO. : 12/288309
DATED           : June 21, 2011
INVENTOR(S)     : Joseph P. Wieczorek and Joseph R. Finn It is certified that error appears in the above-identified patent and that said Letters Patent is hereby corrected as shown below:

Col. 7, Line 37 - Please replace "visor 10" with "visor 110"

Signed and Sealed this
Twenty-ninth Day of November, 2011

David J. Kappos
*Director of the United States Patent and Trademark Office*